United States Patent Office 3,012,956
Patented Dec. 12, 1961

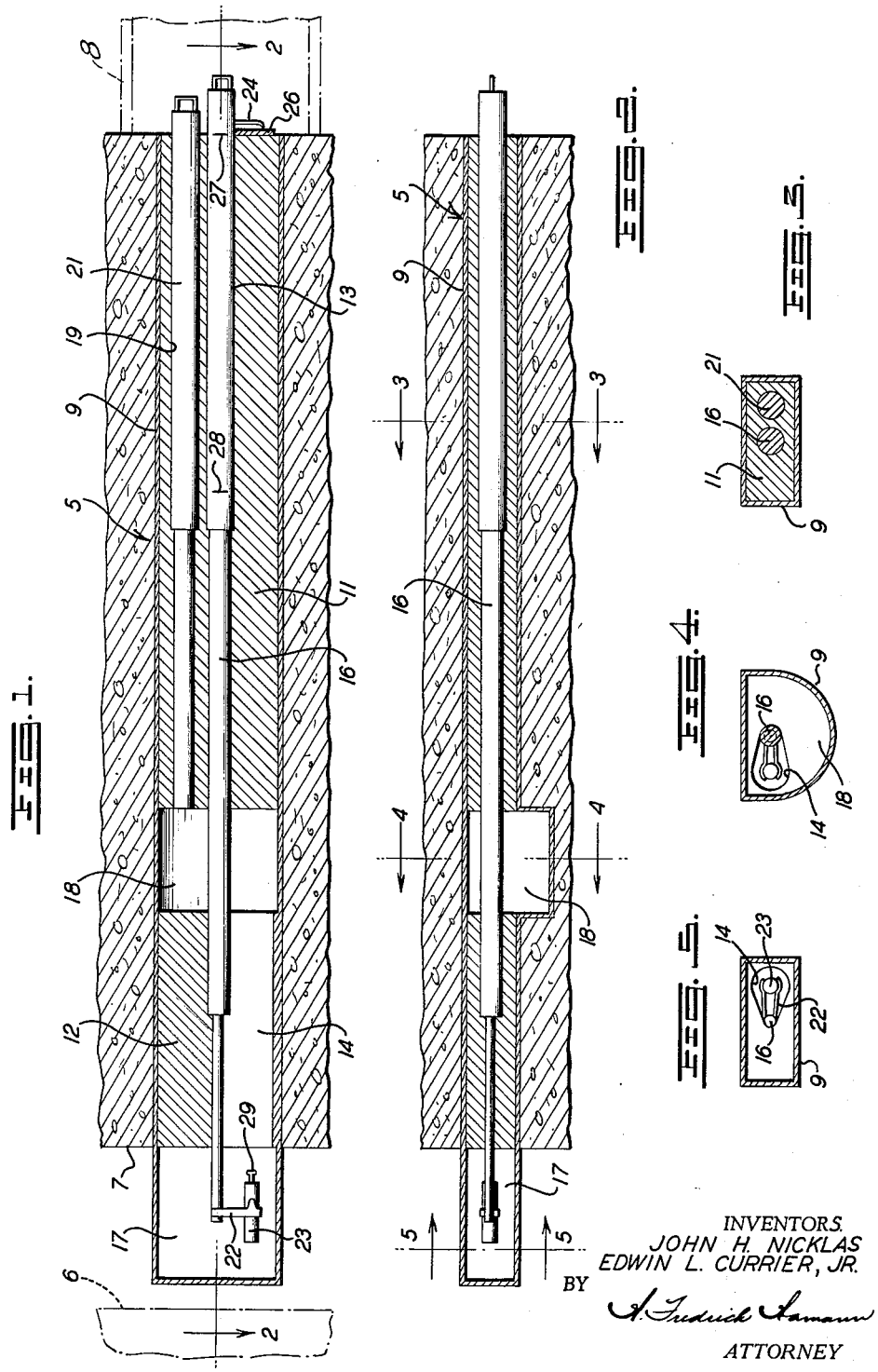

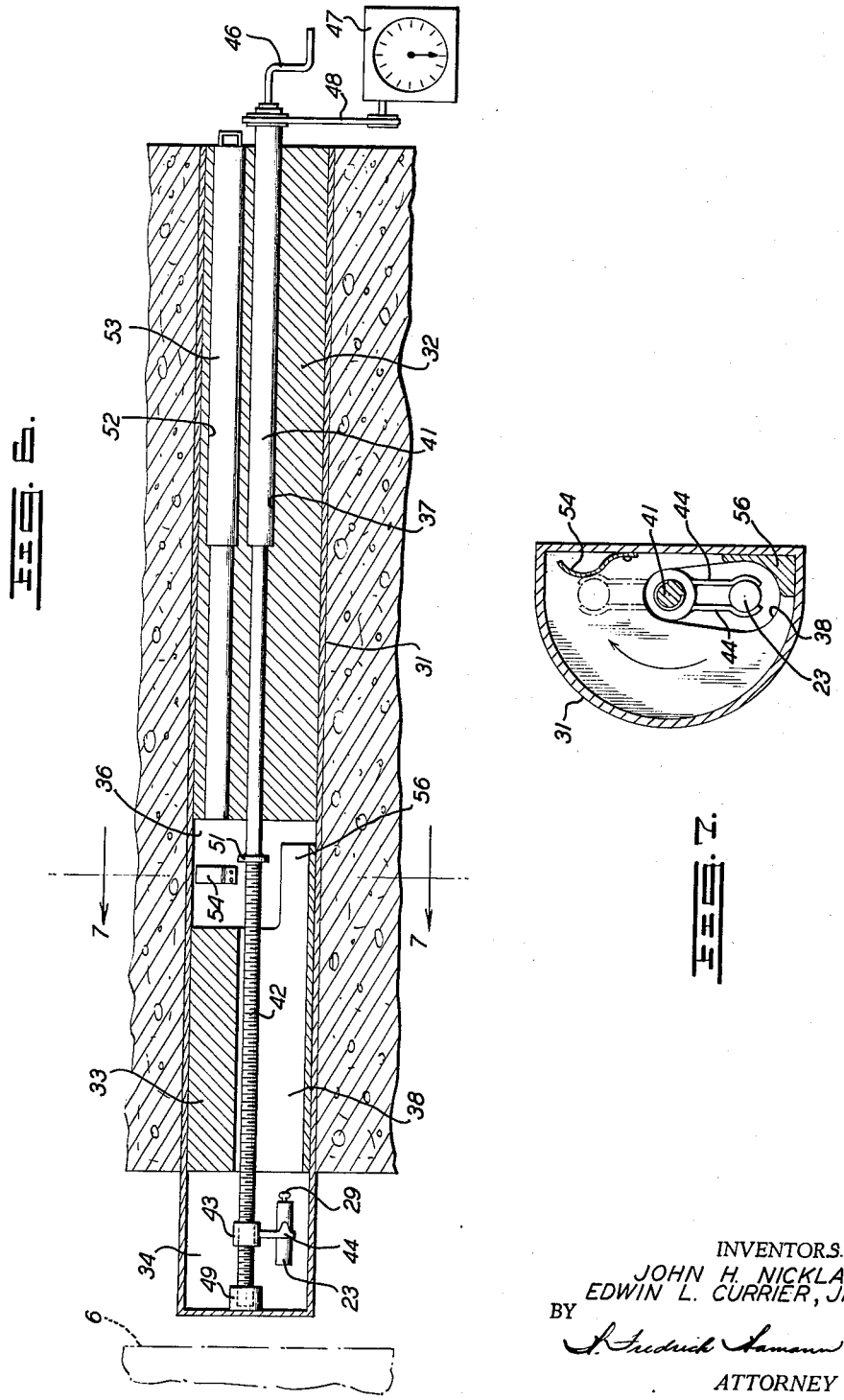

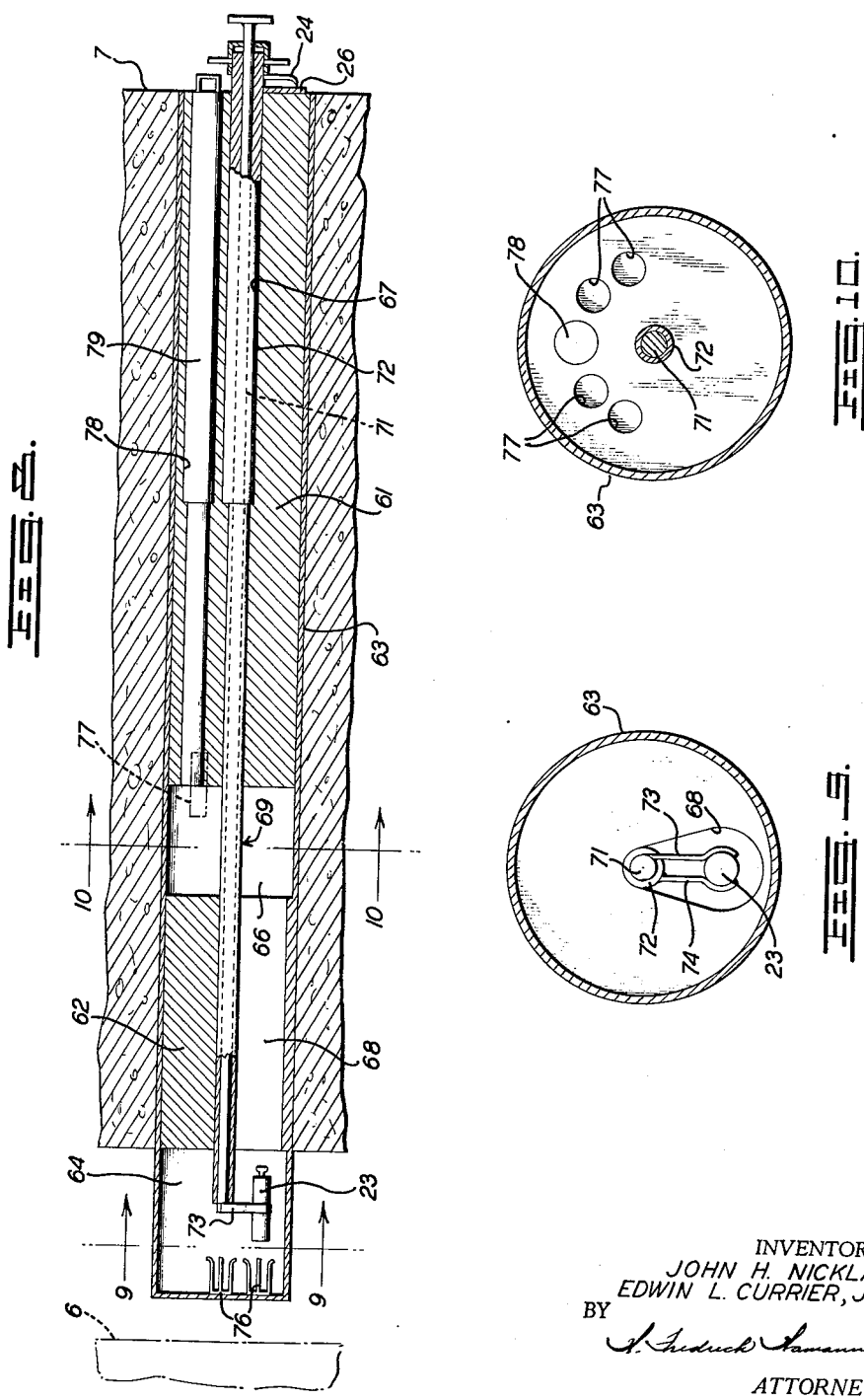

3,012,956
RADIATION FACILITY FOR NUCLEAR
REACTORS
Edwin L. Currier, Jr., Silver Spring, and John H. Nicklas, Riverdale, Md., assignors, by mesne assignments, to the United States of America as represented by the United States Atomic Energy Commission
Filed Dec. 31, 1958, Ser. No. 784,203
11 Claims. (Cl. 204—193.2)

This invention relates to radiation facilities for nuclear reactors and, more particularly, to beam port facilities.

Research nuclear reactors have heretofore been provided with beam ports extending through the reactor shielding to receive samples to be irradiated adjacent the reactor core, each port being provided with a removable shield plug which usually comprises inner and outer cylindrical sections of different diameters to prevent radiation streaming. To conduct an irradiation experiment, the reactor is first shut down, the shield plug is then removed to permit insertion of a sample into the beam port, the plug is then inserted into the port and the reactor is started. To remove an irradiated sample from the beam port, the reactor is shut down. After the neutron production has stopped, the shield plug and sample are drawn from the beam port into a portable shielded flask provided with movable shutters. As it is thus necessary to shut down the reactor during loading and unloading of samples, these operations are usually performed during a scheduled eight hour shut down period.

An object of the present invention resides in the provision of a radiation facility into which samples may be inserted or removed during operation of the reactor without exposing personnel to a beam of radiation from the reactor core.

Another object of the invention resides in the provision of a radiation facility provided with a storage chamber within the shield wall to contain a radioactive sample until the activity is reduced enough to permit removal of the sample into a comparatively light-weight flask.

A further object of the invention resides in the provision of a radiation facility wherein a sample may be moved toward or away from the reactor core to subject the sample to a predetermined radiation flux.

Another object of the invention resides in the provision of a radiation facility provided with rack means to support a plurality of samples adjacent a reactor core for irradiation experiments of different duration. For example, one sample may be removed from the facility after one week of exposure, the second sample may be removed after two weeks of exposure, etc., to thus obtain a series of exposure periods for plotting a radiation damage curve.

The invention embodies other novel features, details of construction and arrangement of parts which are hereinafter set forth in the specification and claims and illustrated in the accompanying drawings, forming part thereof, wherein:

FIG. 1 is a vertical sectional view of a nuclear reactor radiation facility embodying features of the invention.

FIG. 2 is a section taken along line 2—2 of FIG. 1.

FIGS. 3, 4 and 5 are transverse sections taken along the lines 3—3, 4—4 and 5—5, respectively, of FIG. 2.

FIG. 6 is a vertical sectional view illustrating a modified form of the invention.

FIG. 7 is a transverse section taken along the line 7—7 of FIG. 6.

FIG. 8 is a vertical sectional view illustrating another embodiment of the invention.

FIGS. 9 and 10 are transverse sectional views taken along the lines 9—9 and 10—10, respectively, of FIG. 8.

Referring now to the drawings for a better understanding of the invention and more particularly to FIGS. 1 to 5 therein, the radiation facility 5 is shown as extending in the direction of its length from adjacent a nuclear reactor core 6 through a biological shield 7 to the outer side of the reactor for registry with a movable lead-lined flask 8 adapted to receive irradiated samples and port plugs.

The radiation facility is shown as comprising an elongated tubular stainless steel housing 9 containing outer and inner shield blocks 11 and 12 formed with passages 13 and 14, respectively, to receive a movable sample conveying rod 16 formed with steps or shoulders to prevent streaming of neutron and gamma rays to the area outside the biological shield. The inner shield block 12 is axially spaced from the inner end of the housing 9 and from the outer shield block 11 to provide a sample irradiation chamber 17 and a transfer chamber 18. The outer shield block 11 is formed with a passage 19 to receive a removable shield plug 21 formed with steps or shoulders to prevent irradiation streaming.

A pair of resilient fingers 22—22 are secured to the inner end of the sample conveying rod 16 for detachable clamping engagement against opposite sides of an autoclave 23 containing a sample to be irradiated. A pointer 24 is secured to the outer end of the rod 16 for registry with a calibrated dial 26 mounted on the block 11 to visually indicate to the operator the rotational position of the fingers 22—22 with respect to the passages 19 and 14. The rod 16 is also provided with a series of markings 27 and 28 to visually indicate to the operator the position of fingers 22—22 with respect to the chambers 17 and 18.

To transfer the autoclave 23 from the irradiation chamber 17 to the flask 8, the rod 16 is first drawn outwardly to convey the autoclave through the passage 14 into the transfer chamber 18. The rod 16 is then rotated 180° to move the autoclave into registry with the passage 19. The shield plug 21 is then withdrawn into the flask 8, and the autoclave 23 is engaged and withdrawn through the passage 19 into the flask by means of a suitable manually operable tool which engages the knob 29 on the autoclave. The foregoing unloading procedure is reversed for conveying an autoclave into the irradiation chamber 17. It will be noted that the passages 14 and 19 are offset laterally from each other to prevent irradiation streaming through the facility, during transfer of an autoclave into and out of the facility when the shield plug 21 is removed.

FIG. 6 illustrates a modified form of the invention which is shown as comprising a housing 31 having shield blocks 32 and 33 mounted therein to provide an irradiation chamber 34 and a transfer chamber 36. The shield blocks 32 and 33 are formed with passages 37 and 38, respectively, to receive a rotatable sample conveying rod 41 having its inner end threaded at 42 for threaded engagement with a sample carrier 43. Resilient fingers 44—44 are provided on the carrier 43 for clamping engagement against opposite sides of an autoclave 23.

The rod 41 is manually rotatable by means of a crank 46 and is connected to an indicator device 47 by means of a chain and sprocket transmission 48. During rotation of the rod 41, the carrier 43 is conveyed axially between a bearing 49 and a stop collar 51. A passage 52 is provided in the block 32 above the rod 41 to receive a removable shield plug 53.

To remove the autoclave 23 from the facility, the rod 41 is rotated in a clockwise direction to move the carrier 43 from the irradiation chamber 34 to the transfer chamber 36 for abutting engagement against the collar 51; after which, further rotational movement of the rod through an arc of 180° acts to swing the carrier to position the autoclave 23 in registry with the passage 52 and into abutting engagement against a resilient buffer spring 54 mounted on the housing 31. After removal of the shield plug 53, the autoclave 23 may be manually removed through the passage 52 by means of a suitable tool engageable with the knob 29 on the autoclave.

Upon insertion of another autoclave between the fingers 44—44, the rod 41 is rotated in an anti-clockwise direction to first cause the carrier and autoclave to swing downwardly against a guide portion 56 on the block 33 and then to cause the carrier to move from the transfer chamber 36, through the passage 38 into the irradiation chamber 34. It will be noted that the buffer spring 54 acts to bias the carrier and autoclave into position to swing downwardly by gravity against the guide portion 56.

FIGS. 8, 9 and 10 illustrate another embodiment of the invention in which the radiation facility is shown as comprising shield blocks 61 and 62 mounted within a housing 63 to provide an irradiation chamber 64 and a transfer chamber 66. The blocks 61 and 62 are formed with passages 67 and 68, respectively, to receive a rotatable sample conveying means 69 comprising a rod 71 rotatably mounted in a sleeve 72.

Fingers 73 and 74 are secured to the rod 71 and sleeve 72, respectively, for clamping engagement against opposite sides of an autoclave 23. A plurality of cups 76 are provided within the chamber 64 to receive autoclaves 23 transferred thereto by the conveying means 69. The shield block 61 is formed with storage recesses 77 to receive irradiated autoclaves prior to removal from the facility through a passage 78 which is normally closed by a shield plug 79.

In this form of the invention, the rod 71 and sleeve 72 are manually rotated relative to each other to engage or release an autoclave 23, and are moved axially to convey an autoclave between the chambers 64 and 66. After removal of the shield plug 79, an autoclave may be inserted between or removed from the fingers 73—74 by means of a suitable manipulating tool.

In each of the several forms of the invention herein shown and described, it will be noted that autoclaves, containing sample material, may be transferred to the irradiation chamber, or removed therefrom, without a shutdown of the reactor, and without exposing personnel to a beam of radiation from the reactor core.

Generally, the herein disclosed irradiation facility comprises first and second shield blocks, as represented in FIG. 1 by blocks 12 and 11, disposed within an elongated housing represented by housing 9. In block 12, the passage 14 between chambers 17 and 18, respectively, represents the transfer passage between the irradiation chamber and the transfer chamber. In block 11, the passage 19 represents the loading passage for introducing and removing samples in the facility.

Having described a preferred embodiment of the present invention, it is to be understood that although specific terms and examples are employed, they are used in a generic and descriptive sense and not for purposes of limitation; the scope of the invention being set forth in the following claims.

What is claimed is:
1. In a nuclear reactor having a core of fissionable fuel elements enclosed within a biological shield, an elongated housing extending in the direction of its length through the biological shield to and having one end portion adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, and means operable to move a sample laterally within said transfer chamber between said passages and through said transfer passage between said transfer chamber and said irradiation chamber.

2. In a nuclear reactor having a core of fissionable fuel elements enclosed within a biological shield, an elongated housing extending in the direction of its length through the biological shield to and having one end portion adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, and means operable to move a sample laterally within said transfer chamber between said passages and through said transfer passage between said transfer chamber and said irradiation chamber, said means comprising a rotatable rod extending lengthwise relative to said housing through said blocks and along one side of said transfer passage.

3. In a nuclear reactor having a core of fissionable fuel elements enclosed within a biological shield, an elongated housing extending in the direction of its length through the biological shield to and having one end portion adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, and means operable to move a sample laterally within said transfer chamber between said passages and through said transfer passage between said transfer chamber and said irradiation chamber, said means comprising a rotatable rod extending lengthwise relative to said housing through said blocks and along one side of said transfer passage, and a pair of fingers on said rod to engage a sample therebetween.

4. In a nuclear reactor having a core of fissionable fuel elements enclosed within a biological shield, a tubular housing closed at one end and extending in the direction of its length through the biological shield having said one end adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, means operable to move a sample laterally within said transfer chamber between said passages and through said transfer passage between said transfer chamber and said irradiation chamber, said means comprising a rotatable rod extending lengthwise relative to said housing through said blocks and along one side of said transfer passage, a pair of fingers on said rod to engage a sample therebetween, and means to visually indicate the position of said fingers within the housing.

5. In a nuclear reactor having a core of fissionable fuel elements enclosed within a biological shield, a tubular housing closed at one end and extending in the direction of its length through the biological shield having said one end adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, means operable to move a sample laterally within said transfer chamber between said passages and through said transfer passage between said transfer chamber and said irradiation chamber, said means comprising a rotatable rod extending lengthwise relative to said housing through said blocks and along one side of said transfer passage, a pair of fingers on said rod to engage a sample therebetween, and means to visually indicate the position of said fingers within the housing, and means operable responsive to rotation of said rod to move said fingers along the rod and laterally within said transfer chamber.

6. In a nuclear reactor having a core of fissionable fuel elements enclosed within a biological shield, an elongated housing extending in the direction of its length through the biological shield to and having one end portion adjacent the reactor core, first and second shield blocks arranged in said housing at predetermined distances respectively from said one end thereof so as to define an irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, and means operable to move a sample laterally within said transfer chamber between said passages and through said transfer passage between said transfer chamber and said irradiation chamber, and a rod and sleeve extending axially relative to said housing axis through said blocks and along one side of said transfer passage having fingers mounted thereon for relative movement to engage a sample therebetween.

7. In a nuclear reactor having a core of fissionable fuel elements enclosed within a biological shield, a radiation facility comprising a tubular housing extending in the direction of its length through said shield and having one end thereof adjacent said core, first and second shield blocks arranged in said housing at predetermined distances respectively from said one end thereof to define a dry irradiation chamber adjacent said core at one end of said first block and a transfer chamber at the other end of said first block, said first block having a transfer passage leading from said transfer chamber to said irradiation chamber, and said second block having a loading passage leading from said transfer chamber to the outer side of the biological shield, said loading passage being offset laterally from said transfer passage, rotatable means operable to move a sample laterally within said transfer chamber between said passages and lengthwise relative to said housing through said transfer passage between said transfer chamber and said irradiation chamber, and a removable shield plug in said loading passage.

8. In a beam port radiation facility for nuclear reactors, an elongated housing, means including first and second shield blocks within the housing for defining an irradiation chamber at said one end of said housing, said blocks being longitudinally spaced with respect to each other and said first block being spaced from one end of said housing and a transfer chamber at an intermediate portion of said housing, said first shield block having a transfer passage extending between said irradiation chamber and said transfer chamber, said second shield block having a loading passage extending lengthwise through said block and offset laterally from said transfer passage, and means to move a sample through said transfer passage.

9. In a beam port radiation facility for nuclear reactors, an elongated housing, means comprising a first shield block within said housing to define an irradiation chamber at one end of said housing, a second shield block within said housing spaced from said first shield block so as to define a transfer chamber therebetween, said first shield block having a transfer passage therethrough, said second shield block having a loading passage therethrough offset laterally from said transfer passage, and means comprising a conveyor device with sample engaging fingers thereon to move a sample through said transfer passage.

10. In a beam port radiation facility for nuclear reactors, an elongated housing, first and second shield blocks in said housing spaced from one end of said housing and from each other lengthwise of said housing so as to define an irradiation chamber at the end of said first block adjacent to said one end of said housing, and a transfer chamber between relatively adjacent ends of said blocks, said first block having a transfer passage therethrough, said second shield block having a loading passage therethrough offset laterally from said transfer passage, and means comprising a conveyor device with sample engaging fingers thereon to move a sample through said transfer passage, and means to visually indicate the position of said fingers within said facility.

11. In a beam port radiation facility for nuclear reactors, an elongated housing, first and second shield blocks spaced from each other within the housing in the longitudinal direction of the latter so as to define a transfer chamber between one end of said first block and the adjacent end of said second block, said housing extending beyond the other end of said first block so as to define an irradiation chamber adjacent said other end of said first block having a transfer passage therethrough, a second block having a loading passage therethrough offset laterally from said transfer passage, and means comprising a conveyor device with sample engaging fingers thereon to move a sample through said transfer passage, and means to visually indicate the position of said fingers within said facility, and a removable shield plug in said loading passage.

References Cited in the file of this patent
UNITED STATES PATENTS
2,874,107    Ohlinger et al. _ _ _ _ _ _ _ _ _ _ Feb. 17, 1959